United States Patent [19]
Arai

[11] Patent Number: 5,519,466
[45] Date of Patent: May 21, 1996

[54] ELECTRONICALLY CONTROLLED CAMERA

[75] Inventor: Akihiro Arai, Tokyo, Japan

[73] Assignee: Asahi Kogaku Kogyo Kabushiki Kaisha, Tokyo, Japan

[21] Appl. No.: 339,256

[22] Filed: Nov. 10, 1994

[30] Foreign Application Priority Data

Nov. 10, 1993 [JP] Japan .................. 5-064954 U

[51] Int. Cl.⁶ .................................................. G03B 15/05
[52] U.S. Cl. .................. 354/403; 354/415; 354/126; 354/145.1
[58] Field of Search .................. 354/403, 413, 354/415, 126, 145.1

[56] References Cited

U.S. PATENT DOCUMENTS

| | | |
|---|---|---|
| 4,922,280 | 5/1990 | Koshino et al. . |
| 5,028,949 | 7/1991 | Kawano . |
| 5,051,767 | 9/1991 | Honma et al. . |
| 5,217,299 | 6/1993 | Yoshida et al. . |

Primary Examiner—Michael L. Gellner
Assistant Examiner—D. P. Malley
Attorney, Agent, or Firm—Greenblum & Bernstein

[57] ABSTRACT

An automatic focusing camera having a strobe, a light source for emitting visible light having a first wavelength, a light source for emitting light having a second wavelength, and a lens. The visible light and the second wavelength light are transmitted through the lens, and projected towards an object to be photographed.

20 Claims, 7 Drawing Sheets

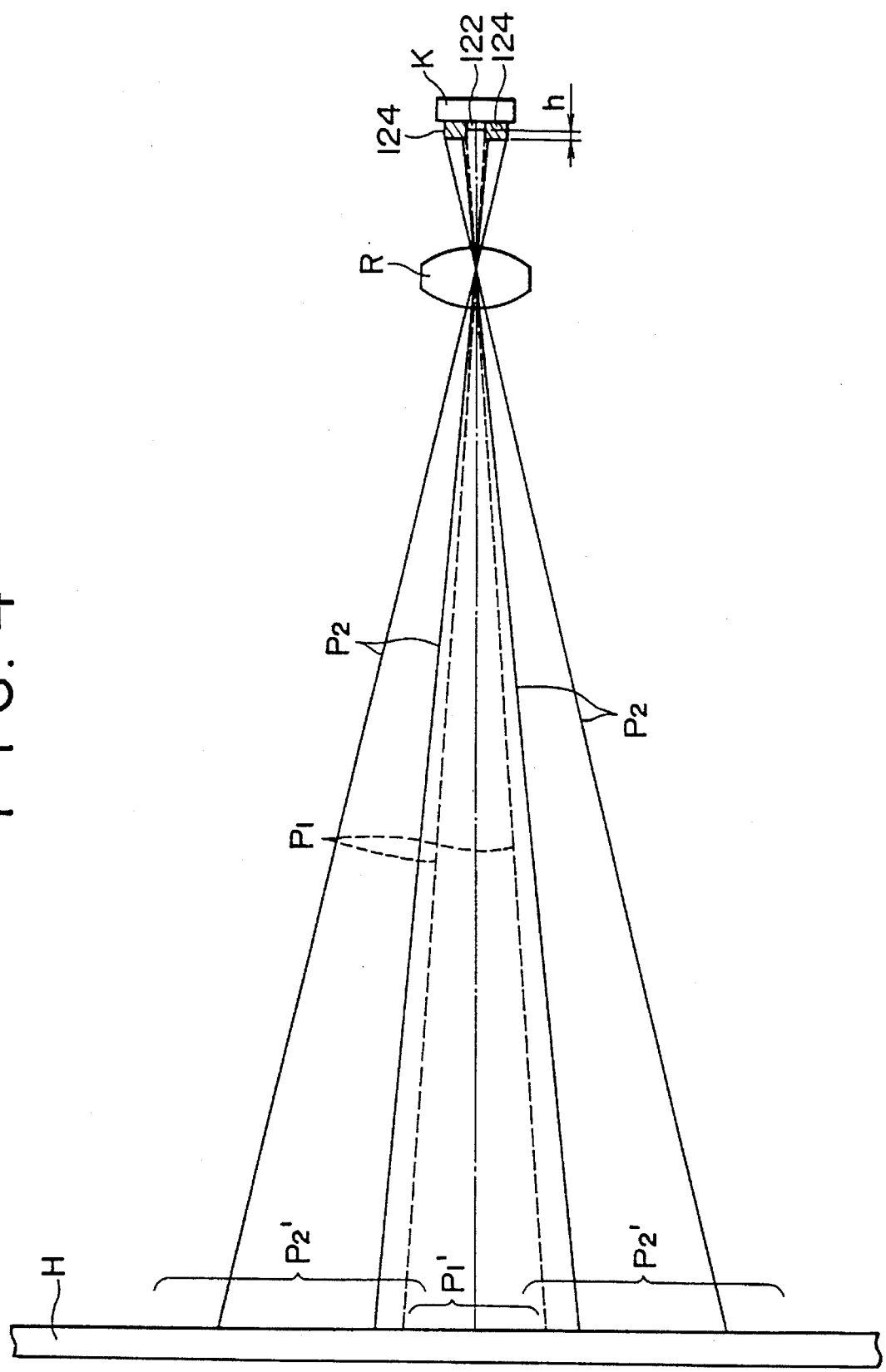

ELECTRONICALLY CONTROLLED CAMERA

BACKGROUND OF THE INVENTION

The present invention relates to an electronically controlled camera which functions to prevent red-eye phenomenon when a photograph is taken of a person using a strobe device.

Conventionally, a strobe device is used to provide illumination in order to take a photograph of a person when an ambient light level is low. Before the photograph is taken, the pupil of the eye will normally be dilated since the ambient light level is low. When a strobe device is discharged, the pupil cannot constrict quickly enough in order to compensate for the bright light. Therefore, light enters the pupil, and is partially absorbed in the retina. The remaining light is reflected from the retina, and exits the pupil. This is a problem if the strobe device is located near the photographing lens of the camera since the pupil will appear bright red on the photograph, producing an undesirable effect when taking photographs of people using a strobe device.

Recently, some cameras have reduced the effect of the red-eye phenomenon by first emitting a pre-flash in order to constrict the size of the pupils, followed by the actual flash that is used to provide the illumination necessary to take the photograph.

However, a problem with this method is that the person to be photographed may think that the pre-flash is the actual flash, and may change position or move before the actual flash is emitted. Further, since the strobe device is used to emit both the pre-flash and the actual flash, the pre-flash may be too bright.

In order to avoid these problems, an LED has been employed to provide the pre-flash. However, if the electronically camera employs an active distance measuring system, an infrared LED must also be provided. Therefore, since the pre-flash LED, the strobe device and the infrared LED must all illuminate the object to be photographed, three light sources must be provided on a front panel of the electronically controlled camera. Therefore, each light source requires additional hardware such as lenses. Further, the front panel of the camera must be made larger in order to accommodate all of the light sources. This will increase the costs of manufacturing the camera, as well as increase the size of the camera.

SUMMARY OF THE INVENTION

It is therefore an object of the present invention, to provide an electronically controlled auto-focus camera which emits infrared light for distance measuring, and visible light for preventing the red-eye phenomenon, while reducing the costs of manufacturing the camera and keeping the size of the camera small.

According to an aspect of the present invention, there is provided an automatic focusing camera having a strobe. The camera includes:

a light source for emitting visible light having a first wavelength;

a light source for emitting light having a second wavelength; and a lens.

The second wavelength light and the visible light are transmitted through the lens, and projected towards an object to be photographed.

According to another aspect of the present invention, there is provided an automatic focusing camera having a strobe light source and another light source for emitting visible light having a first wavelength at a predetermined time period before the strobe is discharged, in order to reduce red eye phenomenon. The camera includes:

a device used for measuring distance of an object from the camera, including a light source for emitting light having a second wavelength; and a lens.

The second wavelength light and the visible light are transmitted through the lens, and projected towards an object to be photographed.

BRIEF DESCRIPTION OF THE DRAWINGS

FIG. 4 shows a ray diagram of light emitted by the light emission unit shown in FIG. 3;

DESCRIPTION OF THE EMBODIMENTS

Figure 1:
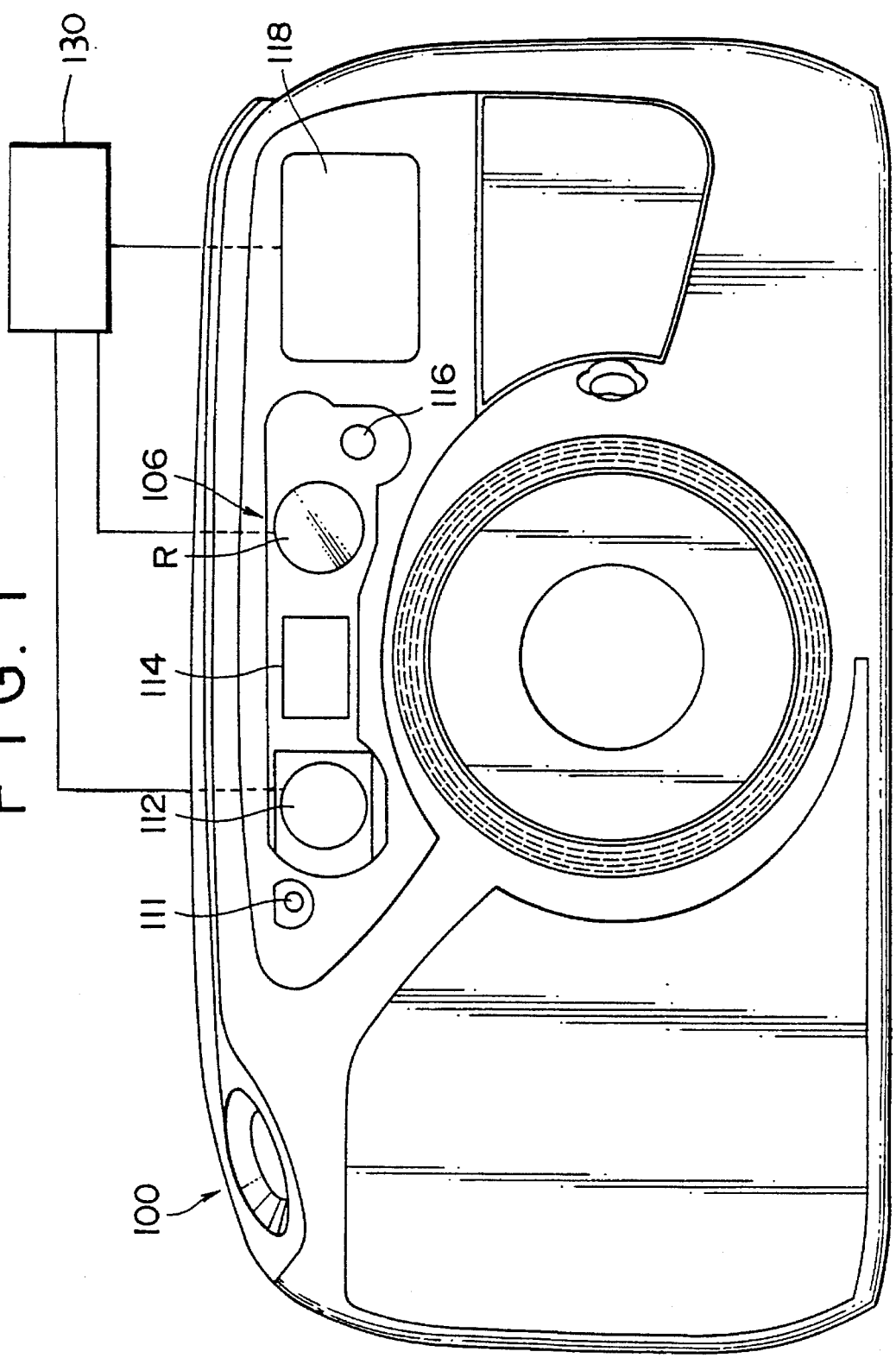
FIG. 1 shows a front view of an electronically controlled camera employing the present invention.
Figure 2:
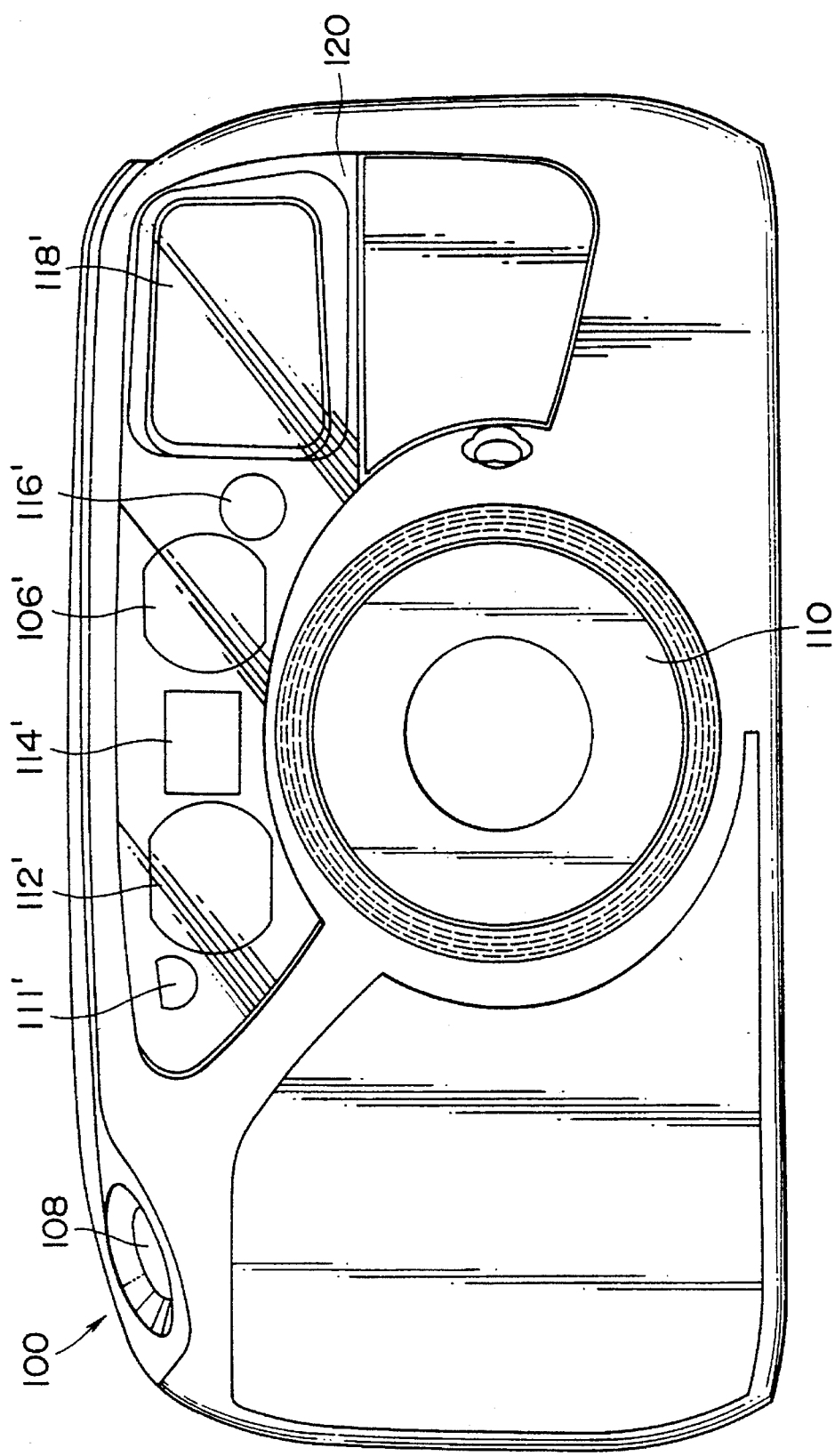
FIG. 2 shows a front view of the camera shown in FIG. 1, having a front plate attached.

FIGS. 1 and 2 show a front view of an electronically controlled autofocus camera 100 (hereinafter called camera 100) which embodies the present invention. In FIG. 2, a window plate 120 is shown.

The camera 100 includes a light emission unit 106 having a lens R, a shutter button 108, a photographing lens 110, and a photographing indicator 111. The camera 100 is further provided with an infrared light receiving device 112, a finder 114, a photometric device 116 and a strobe 118.

As shown in FIG. 2, the window plate 120 includes portions 106', 111', 112', 114', 116', and 118'. Portions 111', 114', 116' and 118' are colorless transparent portions and cover the photographing indicator 111, the finder 114, the photometric device 116 and the strobe 118, respectively. Portion 112' which covers the infrared light receiving device 112 is formed to allow only infrared light to pass through. Portion 106' which covers light emission unit 106, allows infrared and visible light to pass through. The light emission unit 106 and the infrared light receiving device 112 serve as a distance measuring device.

Figure 3:
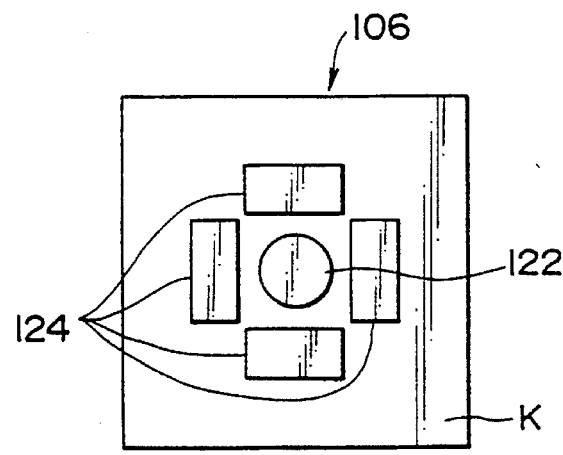
FIG. 3 shows a light emission unit used in the camera shown in FIG. 1.

FIG. 3 shows a configuration of a light emission unit 106 according to a first embodiment of the present invention. Light Emitting Diodes (LEDs) 124 are mounted on circuit board K, and surround an infrared LED (IRLED) 122 also mounted on the circuit board K. The LEDs 124 are rectangular in shape and emit visible light through the lens R towards an object to be photographed. The IRLED 122 is arranged along an optical axis of the lens R, and is positioned such that an image of the IRLED 122 is formed about 3 meters away from the lens R. Further, the LEDs 124 are mounted such that the distance between the LEDs 124 and the circuit board K is different than the distance between the IRLED 122 and the circuit board K. Thus an in-focus image formed by the LEDs 124 is located at a different position along the optical axis of lens R, than the image formed by the IRLED 122.

The LEDs 124 are also positioned such that sufficient visible light can be emitted over a range within a 3 m distance in front of the camera 100, where a person's face (i.e., eyes) might be located when the strobe 118 emits light. This effectively reduces the red-eye phenomenon.

FIG. 4 shows a ray diagram of the path of light emitted by LEDs 124 and IRLED 122 towards an object plane H. The object plane H is located at a distance of approximately 3 m in front of the camera 100. The lens R allows both infrared and visible light to pass through, and projects the light emitted by LEDs 124 and IRLED 122 towards the object plane H. In FIG. 4, P1 represents rays of light emitted by IRLED 122 and P2 represents rays of light emitted by LEDs 124.

An in-focus image P1' is formed by the rays P1 on the object plane H, while images P2' are formed by the rays P2. In the present embodiment, the IRLED 122 is positioned such that image P1' is focused at a distance approximately 3 m in front of the lens R.

As mentioned above, the LEDs 124 and IRLED 122 are located at different positions along the optical axis of the lens R. In this embodiment, a front surface of the LEDs 124 is a distance h closer to the lens R than a front surface of the IRLED 122. This results in image P2' not being in focus on object plane H. This is required since the LEDs 124 are positioned around the IRLED 122, and therefore, if the image P2' was in focus (as shown by image P2" in FIG. 5, described below), the area where the optical axis intersects the object plane H would not receive sufficient light from the LEDs 124. This would limit the effectiveness of reducing the red-eye phenomenon.

Figure 5:
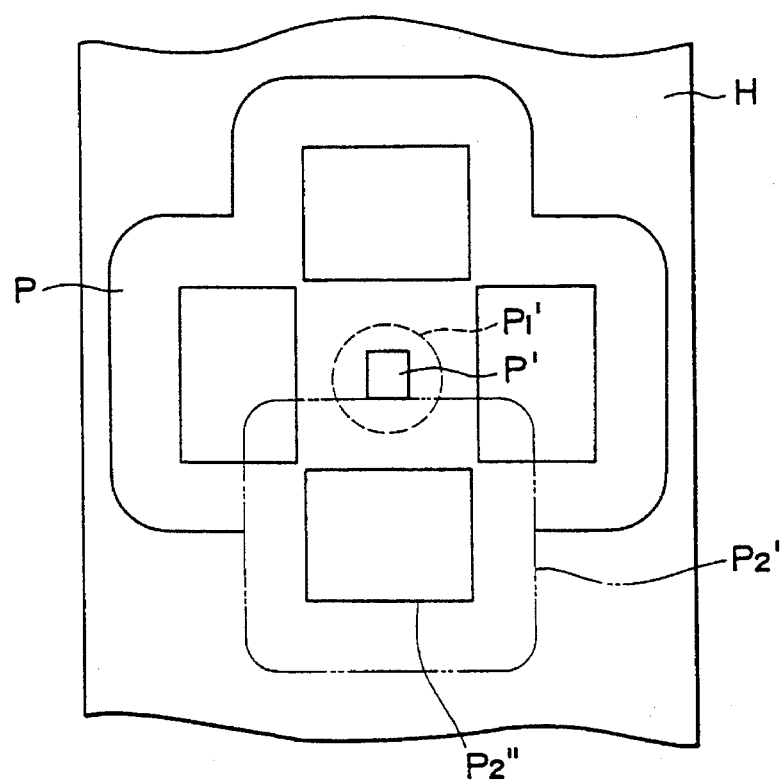
FIG. 5 shows an image of the light emitted by the light emission unit of FIG. 3, on an object H.

FIG. 5 shows an image P projected on the object H. The the image P consists of the images P2' of the LEDs 124 and image P1' of the IRLED 122. Only one of the images P2' corresponding to one of the LEDs 124 is shown in FIG. 5, but a similar image is formed for the other LEDs 124. The image P2" represents a size of an in-focus image of rays P2 which would be formed if the object H was located at an appropriate position along the optical axis where the in-focus image of the rays P2 would be formed. Area P' represents an area on object H where the images P2' are not formed. This is a relatively small area since the images P2' are not in focus and cover a fairly large area.

Thus, with this construction, the light emission unit 106 can project a sufficient intensity of light over an area wide enough to prevent the red-eye phenomenon from occurring, when a person being photographed is located approximately of 3 m in front of the camera 100. The distance 3 m represents the most frequent distance in front of a camera at which a person or group of people are positioned when a photograph is taken in which a strobe device is used to provide illumination.

Figure 6:
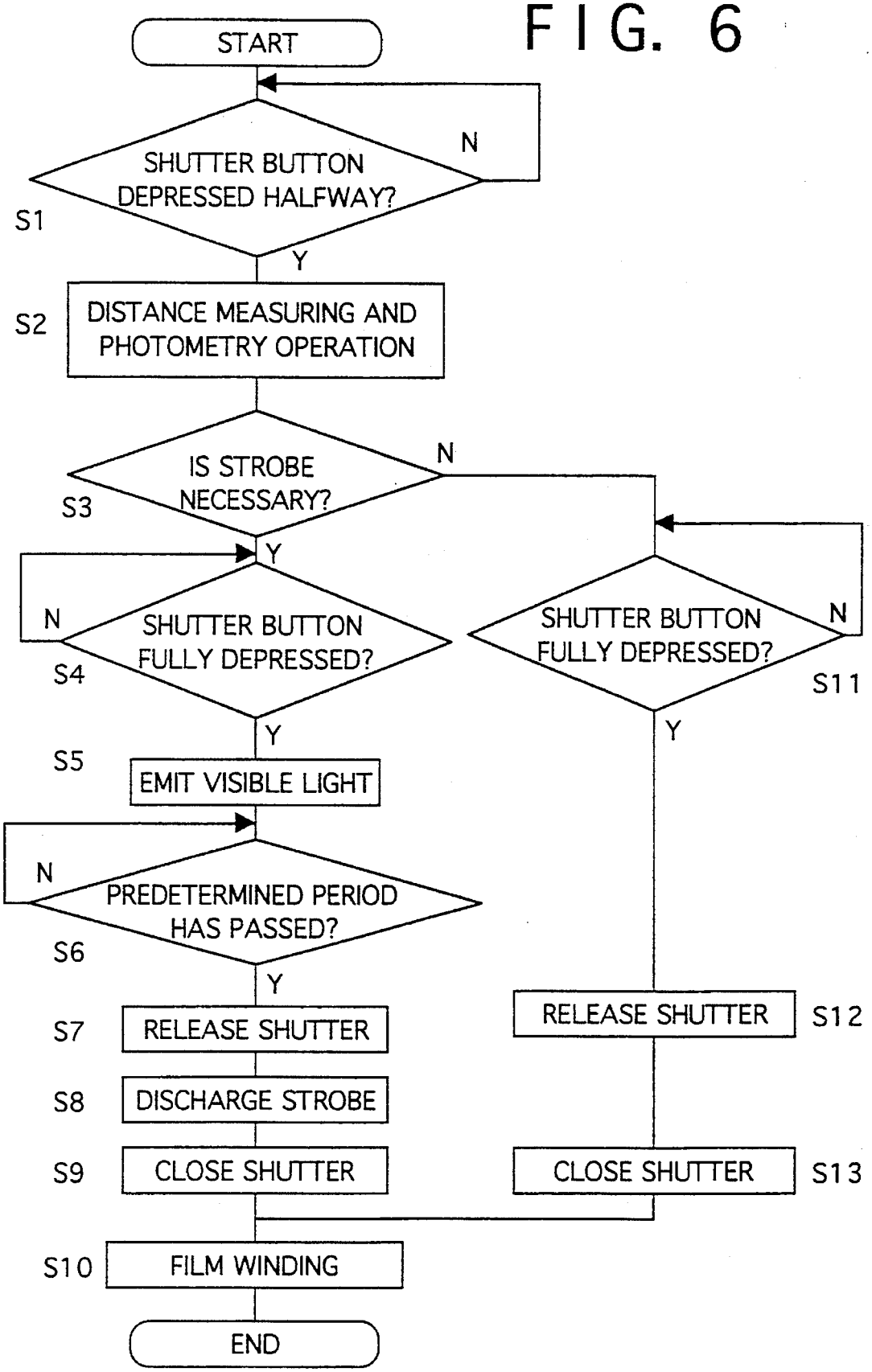
FIG. 6 shows a flowchart of a control sequence of the camera shown in FIG. 1.

An operation of the control sequence of the camera will be described with reference to the flowchart of FIG. 6, and is carried out by the controller 130 schematically illustrated in FIG. 1.

If the shutter button 108 has been depressed halfway in step S1, a CPU (not shown) of the camera determines a distance of an object to be photographed from the camera 100, using the IRLED 122 and infrared light receiving device 112, in step S2. The CPU also determines an appropriate shutter speed and lens aperture value in accordance with metering information provided by an exposure system (not shown) and photometric device 116, in step S2. Then, based on the metering information, the CPU determines whether the strobe device 118 is required to provide illumination of the object to be photographed, in step S3.

If the strobe is not required (S3:NO) and the shutter button 108 has been fully depressed (S11:YES), the shutter is released in step S12, and then closed in step S13. Control then goes to step S10 where the film is advanced by one frame, after which the control sequence is terminated.

If the strobe is required (S3:YES) and the shutter is fully depressed in step S4, then the CPU controls the LEDs 124 to emit light. After a predetermined time period has passed in step S6, the shutter is released in step S7, and the strobe is discharged in step S8. Then in step S9, the shutter is closed. The film is then advanced by one frame in step S10 after which the control sequence is terminated.

Figure 7:
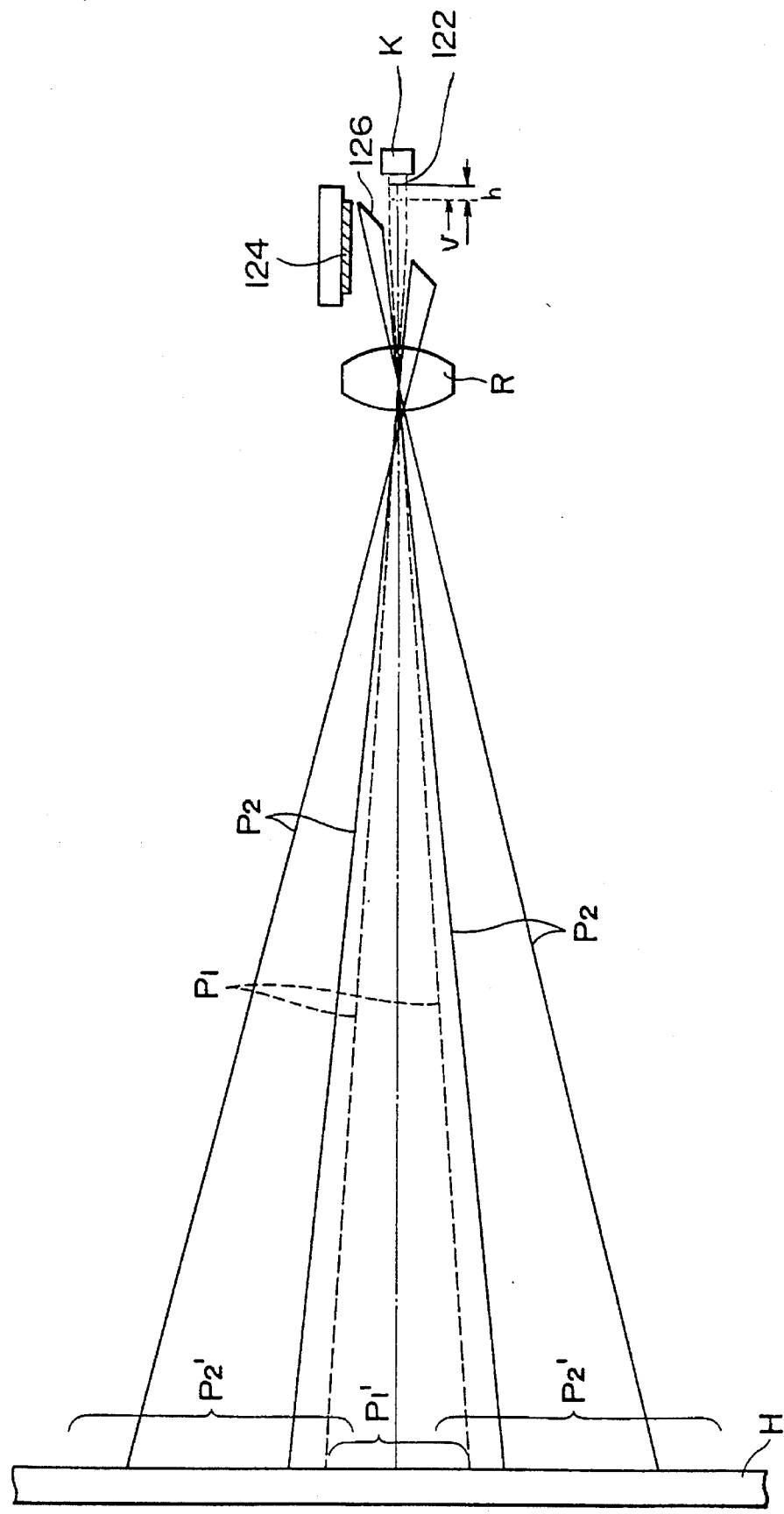
FIG. 7 shows a ray diagram and configuration of a second embodiment of the present invention.
Figure 8:
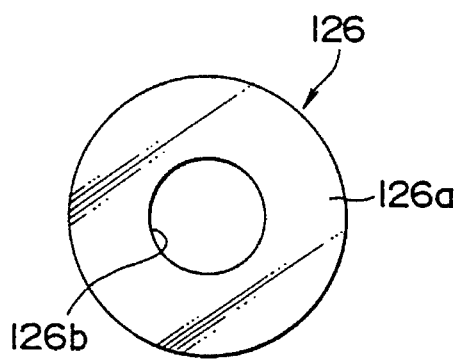
FIG. 8 shows a mirror used in the second embodiment shown in FIG. 7.

FIG. 7 shows a second embodiment of the present invention. In this embodiment the circuit board K supports the IRLED 122, while the LEDs 124 are positioned on a separate support and arranged on a plane perpendicular to the plane of the circuit board K. A ring-shaped mirror 126 is positioned such that a plane of the mirror 126 forms an acute angle with the plane of the circuit board K and the plane of the support of the LEDs 124. The mirror 126, shown in more detail in FIG. 8, consists of a reflective surface 126a and an opening 126b. The mirror 126 is positioned such that light from LEDs 124 is reflected by the reflection surface 126a, and incident on the lens R, along an optical axis which is coincident with the optical axis of IRLED 122. Further, the position of the mirror is such that a virtual image of the LEDs 124 is positioned on plane v which is located nearer to the lens R by a distance h, than the front surface of the LEDs 122. The lens R then projects rays P2 to form images P2' of the LEDs 124, in a manner similar to the that for the first embodiment described above.

Further, the mirror 126 is positioned to allow light from the IRLED 122 to pass through the opening 126b. The light is then incident on the lens R- The lens R then projects rays P1 to form an image P1' in a manner similar to the that for the first embodiment described above.

Figure 9:
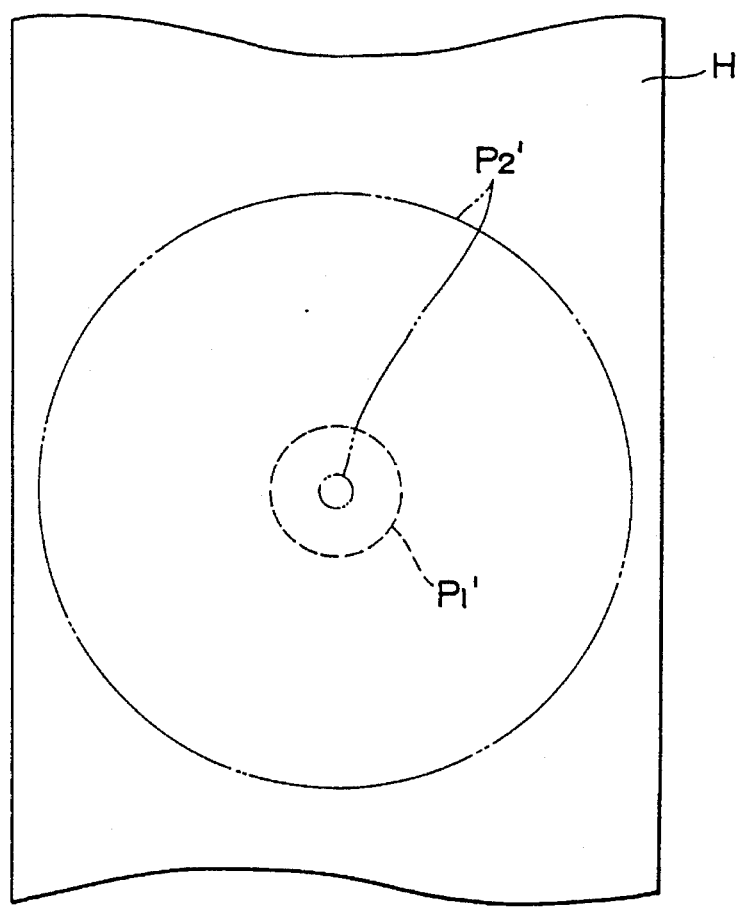
FIG. 9 shows an image of light emitted by the second embodiment of the present invention shown in FIG. 7.

FIG. 9 shows the image projected according to the second embodiment of the present invention. The image P1' corresponding to the IRLED 122 is formed within the dotted circle marked as P1' in FIG. 9. The image P2' corresponding to the LEDs 124 is formed between the innermost circle and outermost circle shown in FIG. 9. Similar to the first embodiment, image P2' is not in focus on object H, whereas image P1' is formed to be an in-focus image. Further, image P2' is formed over a sufficiently large area and has sufficient light intensity to prevent the red eye phenomenon from occurring when used before the discharge of strobe device 118.

Figure 10:
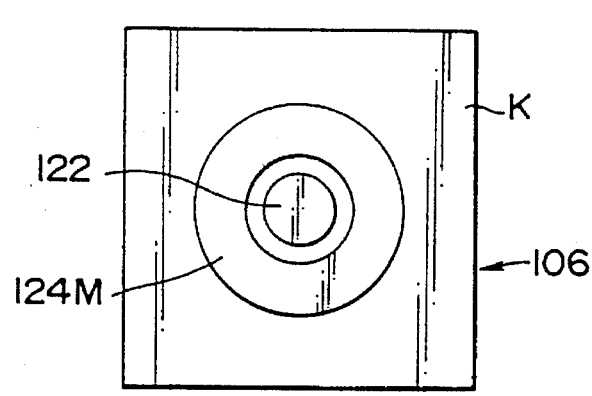
FIG. 10 shows a third embodiment of the light emission unit used in the present invention.

FIG. 10 shows a third embodiment according to the present invention. This embodiment is similar to the first embodiment described above. However, the four LEDs 124 are replaced by a single cylindrical LED 124M. This results in a light source which has a similar shape to the light source produced by LEDs 124 and mirror 126 in the second embodiment described above. Further, a front surface of the LED 124M is a distance h closer to the lens R than the front surface of IRLED 122. Therefore, an image pattern produced by the third embodiment is similar to that shown in FIG. 9, produced by the second embodiment.

As described above, light emitted by the IRLED 122 and light emitted by the visible light LEDs 124 are projected by a single lens R towards an object. Therefore, the costs of manufacturing the camera can be lowered since only one lens R is required. Further, the size of the camera body can be reduced since less hardware is required.

The present disclosure relates to subject matter contained in Japanese Utility Model Application No. HEI 5-064954 filed on Nov. 10, 1993, which is expressly incorporated herein by reference in its entirety.

What is claimed is:

1. An automatic focusing camera having a strobe, said camera comprising:

a light source for emitting visible light, said visible light having a first wavelength;

a light source for emitting light having a second wavelength; and a lens, wherein said second wavelength light and said visible light are transmitted through said lens, and projected towards an object to be photographed.

2. The automatic focusing camera according to claim 1, which further comprises a controller, wherein when said strobe is to be discharged to provide light, said controller controls said visible light source to be emitted at a predetermined period of time before said strobe is discharged.

3. The automatic focusing camera according to claim 1, wherein an image of said second wavelength light source is focused at a different position than an image of said visible light source.

4. The automatic focusing camera according to claim 3, wherein said image of said second wavelength light source is formed at a position located a predetermined distance from said camera, and wherein an in-focus image of said visible light source is formed at a distance from said camera which is greater than said predetermined distance.

5. The automatic focusing camera according to claim 3, wherein a front surface of said visible light source is located nearer to said lens than a front surface of said second wavelength light source.

6. The automatic focusing camera according to claim 5, wherein said visible light source consists of a plurality of light emitting diodes, said light emitting diodes arranged to surround said second wavelength light source.

7. The automatic focusing camera according to claim 5, wherein said visible light source consists of a single cylindrical light emitting diode, said cylindrical light emitting diode arranged to surround said second wavelength light source.

8. The automatic focusing camera according to claim 5, wherein said visible light source is arranged on a plane perpendicular to a plane on which said second wavelength light source is arranged, said camera further comprising a mirror arranged to reflect said visible light source to said lens.

9. The automatic focusing camera according to claim 8, wherein said mirror is positioned between said visible light source and said second wavelength light source, said mirror having an opening formed therein to allow said second wavelength light to be transmitted through said opening.

10. The automatic focusing camera according to claim 1, wherein said visible light source and said second wavelength light source are controlled to be emitted at different time intervals.

11. The automatic focusing camera according to claim 10, wherein said second wavelength light is infrared light.

12. An automatic focusing camera having a strobe device and a light source for emitting visible light having a first wavelength, at a predetermined time period before said strobe is discharged, in order to reduce a red eye phenomenon, said camera comprising:

a device for measuring a distance of an object to be photographed from said camera, said distance measuring device including a light source for emitting light having a second wavelength; and a lens, wherein said second wavelength light and said visible light are transmitted through said lens, and projected towards the object to be photographed.

13. The automatic focusing camera according to claim 12, wherein an image of said second wavelength light source is focused at a different position than an image of said visible light source.

14. The automatic focusing camera according to claim 13, wherein a front surface of said visible light source is located nearer to said lens than a front surface of said second wavelength light source.

15. The automatic focusing camera according to claim 14, wherein said visible light source consists of a plurality of light emitting diodes, said light emitting diodes arranged to surround said second wavelength light source.

16. The automatic focusing camera according to claim 14, wherein said visible light source consists of a single cylindrical light emitting diode, said cylindrical light emitting diode arranged to surround said second wavelength light source.

17. The automatic focusing camera according to claim 14, wherein said visible light source is arranged on a plane perpendicular to a plane on which said second wavelength light source is arranged, said camera further comprising a mirror arranged to reflect said visible light source to said lens.

18. The automatic focusing camera according to claim 17, wherein said mirror is positioned between said visible light source and said second wavelength light source, said mirror having an opening formed therein to allow said second wavelength light to be transmitted through said opening.

19. The automatic focusing camera according to claim 12, wherein said visible light source and said second wavelength light source are controlled to be emitted at different time intervals.

20. The automatic focusing camera according to claim 19, wherein said second wavelength light is infrared light.

* * * * *